Sept. 19, 1950      A. G. LADRACH      2,522,877

ELECTROMAGNETIC PRECISION MEASURING GAUGE

Filed Dec. 13, 1947      2 Sheets-Sheet 1

INVENTOR.
Aaron J. Ladrach, deceased,
by Dorothy B. Ladrach,
Administratrix
BY Joseph R. Schofield
Attorney Sept. 19, 1950 A. G. LADRACH 2,522,877
ELECTROMAGNETIC PRECISION MEASURING GAUGE
Filed Dec. 13, 1947 2 Sheets-Sheet 2

INVENTOR.
Aaron G. Ladrach, deceased
by Dorothy B. Ladrach,
Administratrix
BY Joseph K Schofield
Attorney Patented Sept. 19, 1950

2,522,877

UNITED STATES PATENT OFFICE 2,522,877

ELECTROMAGNETIC PRECISION MEASURING GAUGE

Aaron G. Ladrach, deceased, late of Akron, Ohio, by Dorothy B. Ladrach, administratrix, Akron, Ohio, assignor, by mesne assignments, to Niles-Bement-Pond Company, West Hartford, Conn., a corporation of New Jersey Application December 13, 1947, Serial No. 791,604

3 Claims. (Cl. 33—143)

This invention relates to an electro-magnetic precision measuring gauge.

One object of the invention is to provide a measuring gauge of the type described which is of compact construction particularly adaptable for accurately measuring variations in the width of continuous strip material while the strip is in motion.

Another object of the invention is to provide a gauge of the character described including relatively movable gauging elements, between which continuously moving material passes to move the elements correspondingly to off-gauge variations in the material, and a movable armature for manifesting said variations in a magnetic coil in a balancing circuit, the arrangement being such that a given relative movement of said gauging elements is transmitted in a straight line through the various parts to said armature.

Another object of the invention is to provide a gauge of the character described which is of convenient compact structure, efficient in operation and requiring no lubrication for said moving parts.

These and other objects of the invention will be manifest from the following brief description and the accompanying drawings.

Figure 1:
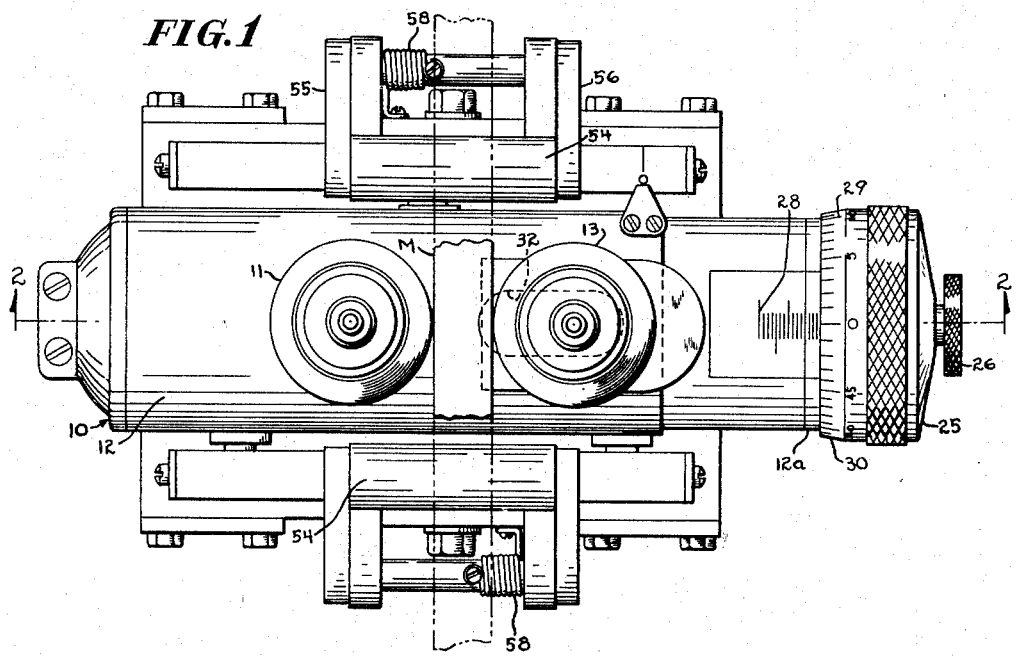
Figure 1 is a top plan view of a width gauge embodying the features of the invention.

Referring to the drawings, the numeral 10 designates a width gauge, wherein material of given width to be continuously gauged while in motion passes between a frictionless roller 11, fixedly mounted on a cylindrical housing 12 of the gauge to rotate freely on a vertical axis, and a similar roller 13 adjustably mounted to be yieldingly moved horizontally from and toward roller 11 with off-gauge variations in width of the material, such movement of roller 13 being utilized to manifest said width variations by electrical means in a manner to be described. Elongated flanges 14, 14 on transversely opposite sides of housing 12 provide base means for supporting the gauge in horizontal position, as best shown in Figure 2.

For supporting the roller 13 so that it may be adjustable toward and from fixed roller 11, to predetermined positions corresponding to the width of material M being gauged, a cylindrical casing 15 is longitudinally slidable within the housing 12. The end of the casing 15 adjacent the movable roller 13 has a closure cap 16 removably threaded thereon, and the other end has a closure plate 17 suitably secured thereon. A pair of strong tension springs 18, 18, extended between a closure plate 19 on the end of the housing 12 and upturned lugs 20, 20 (see Fig. 6) attached to a flat upper face 21a of an anchor block 21 secured within the casing at the bottom thereof, yieldingly urge the casing to a fixed position with respect to said housing, as determined by limiting engagement of a button 22 on plate 16 with the end of an adjustment screw 23, threaded centrally through the end plate 19 of the housing. Spaced apertures 24, 24 are provided in plate 16 for receiving the springs 18 freely therethrough. This arrangement is such that by turning the screw 23 the rollers 11 and 13 may be adjusted to a fixed distance between adjacent side portions thereof corresponding to the given width of strip material M to be continuously gauged. A cup-shaped dial 25 is releasably attached on the end of screw 23 projecting outwardly of the plate 19, as by means of a clamping nut 26 screwed on a threaded extension 27 of reduced diameter on screw 23 (see Figure 2). The dial 25 is adapted to be received over the cylindrical end portion 12a of housing 12, and is longitudinally shiftable with respect thereto with corresponding adjustment of screw 23, the settings for these adjustments being indicated by vernier markings 28 and 29 on housing 12 and a beveled inwardly presented edge 30 of the dial 25, respectively (see Figure 1).

Figure 5:
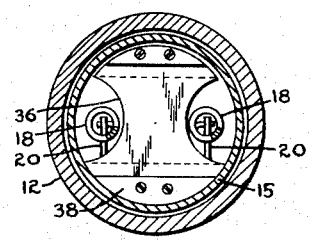
Figure 5 is a cross-section taken on the line 5—5 of Figure 2.
Figure 6:
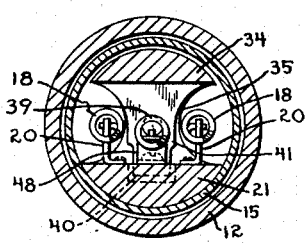
Figure 6 is a cross-section taken substantially on the line 6—6 of Figure 2.
Figure 7:
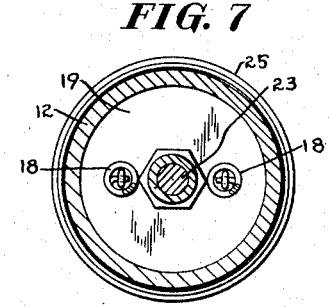
Figure 7 is a cross-section taken on the line 7—7 of Figure 2.

Although the roller 13 is, relatively speaking, normally yieldingly held (by springs 18) in a fixed position of adjustment of movable casing 15 corresponding to the given width of material M, it is necessarily required to be longitudinally yieldingly adjustable with respect to the casing with wide and narrow off-gauge variations from said given width of the material. To this end, a spindle 31 on which roller 13 is journalled extends through longitudinal slots 32 and 33 in the top wall portion of housing 12 and in the adjacent top wall portion of casing 15, respectively, and is threaded into a block 34 supported, as shown in Figures 2, 5 and 6, between the upper ends of upstanding plates 35 and 36 of spring material which are secured at the bottoms thereof, as indicated at 37 and 38, to opposite ends of the anchor block 21. These spring plates 35 and 36 are arranged in parallelism to be yieldingly flexed in either direction longitudinally from a normal position of adjustment of roller 13, as previously described in connection with operation of the dial 25. As the variations in width of material M may only be a few thousandths of an inch over or under gauge, such movement of block 34 is limited to prevent possible damage to the mechanism, by provision of a lip 40 on a lug 41 depending from said block 34 for engagement with opposite sides of a recess 42 in the upper face 21a of relatively fixed block 21. The yielding tension of spring plates 35 and 36 may be accurately regulated by provision of set screw 43 threaded in block 34 and operable, by means of a suitable tool, against an arm 44 of a bell-crank 45 pivoted at 46 to block 34, to change the tension of a spring 39 extended between an arm 47 of the bell-crank and a clip 48 on the upper face 21a of block 21.

Figure 2:
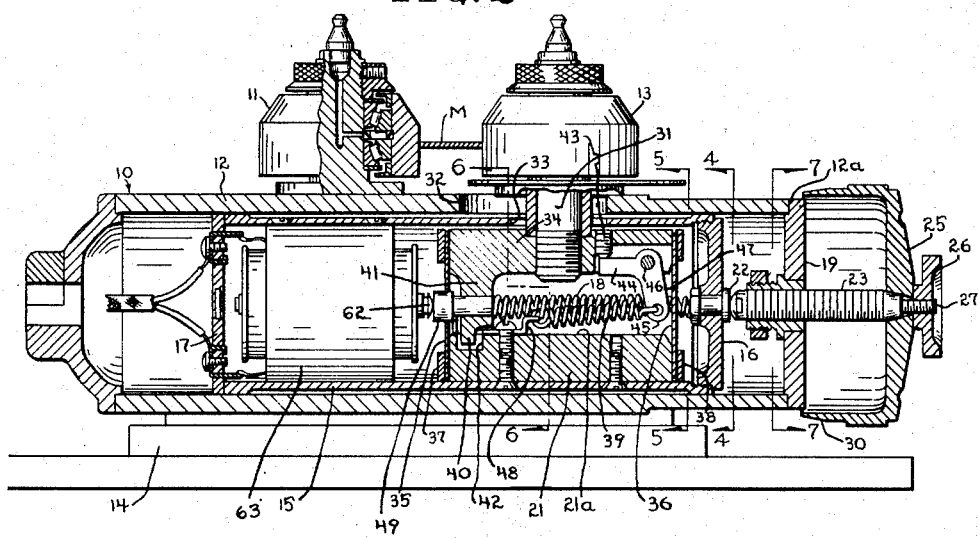
Figure 2 is a vertical cross-section, taken substantially on line 2—2 of Figure 1.

In the setting of the various parts of the mechanism shown in Figure 2, in which the material M is assumed to be of desired width, button 49 provided on lug 41 on the axis of casing 12 is engaged with a plunger 62 forming part of an armature within a balancing circuit 63 which may be of the type shown and described in the A. G. Ladrach Patent No. 2,299,997, wherein the plunger is yieldingly movable to operate an armature between spaced coils to affect an electrical balancing circuit (not shown) according to the variations in width of the material M as manifested by said longitudinal movement of roller 13. Variable positions of the armature and plunger 62 may be indicated in the same manner as in the above referred to patent; that is, by a suitable electrical indicating instrument.

Figure 3:
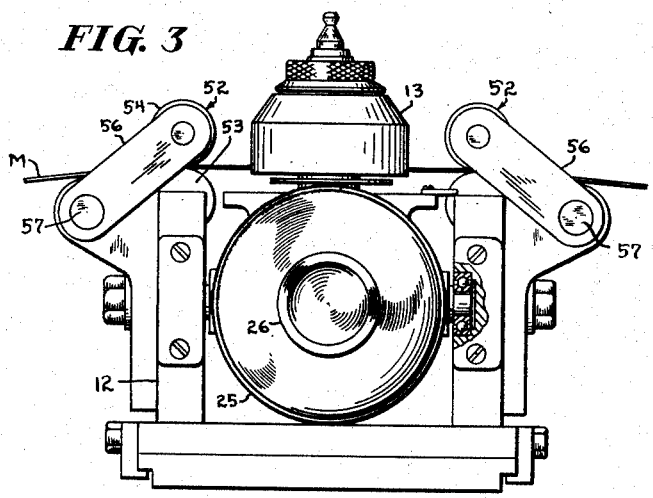
Figure 3 is an end elevation of Figure 1 as viewed from the right thereof.
Figure 4:
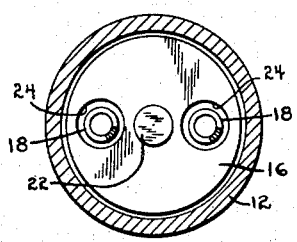
Figure 4 is a cross-section taken on the line 4—4 of Figure 2.

In order to provide for steady continuous passage of the material M between the rollers 11 and 13, the material may be guided between pairs of rollers 52, 52 disposed at laterally opposite sides of the rollers 11 and 13. Each pair of rollers 52 may include a fixed roller 53 suitably journalled on housing 12 and relatively movable roller 54 carried between the free end of spaced arms 55 and 56 which are pivoted at the other ends thereof below the path of strip material M to the housing 12, as indicated at 57 in Figure 3. Suitable spring means 58 is provided for urging the arms 55 and 56 yieldingly to engage the material M between the rollers 53 and 54.

In the use or operation of the improved width gauge described above the roller 13 is moved to predeterminately spaced relation from the fixed roller 11 according to a given desired width of material M to be continuously gauged. The adjustment for this setting is accomplished by rotating the dial 25 until the desired width measurement is indicated on the vernier markings 28 and 29 of housing 12 and dial 25 respectively, in which position the screw 23 will have been moved longitudinally to correspondingly move the cylindrical casing 15 yieldingly urged toward limiting engagement thereof against the inner end of said screw between tension springs 18.

So long as material M passed between the spaced rollers 11 and 13 is precisely of desired predetermined gauge there will be no relative movement of the roller 13 against the yielding action of the spring plates 35 and 36, and hence no movement of plunger 62 and armature will be manifested in the magnetic coil 63 to affect a change in the electrical balancing circuit (not shown). Should the material M, however, be over or under gauge, the difference in width will be manifested in said electrical balancing circuit through movement of roller 13 in one direction or the other, which correspondingly moves the block 34 against the yielding action of parallel spring plates 35 and 36 and tension spring 39.

Thus there has been provided a magnetic gauge device which effectively accomplishes the stated objects of the invention. Modifications may be resorted to without departing from the spirit thereof or the scope of the appended claims.

What is claimed is:

1. A gauge for measuring variable distances, comprising a housing, a hollow casing longitudinally slidable therein, a member flexibly mounted within said casing for movement in opposite directions longitudinally of said casing, a gauging roller mounted in fixed position on said housing, a second gauging roller carried by said yieldingly movable member and movable therewith, means for setting said casing longitudinally within said housing for a given spacing of said rollers for the material being gauged, and a spring-tensioning device for said yieldingly movable member, said device including a bell-crank mounted on said movable member, a tension spring having one end attached to an arm of said bell-crank and the other end attached to a fixed point within said casing, tension adjusting means for said spring engaging the other arm of said bell-crank, and an armature movable with said movable roller, whereby off-gauge variations in the material will correspondingly move said movable roller with respect to said fixed roller and thereby move said armature to plus or minus off-gauge indicating positions.

2. A gauge for measuring variable distances, comprising a housing, a hollow casing longitudinally slidable therein, a member flexibly mounted within said casing for movement in opposite directions longitudinally of said casing, a gauging roller mounted in fixed position on said housing, a second gauging roller carried by said yieldingly movable member and movable therewith, micrometer means for setting said casing longitudinally within said housing for a predetermined spacing of said rollers for the material being gauged, and a spring-tensioning device for said yieldingly movable member, said device including a bell-crank pivotally mounted on said movable member within said casing, a tension spring having one end attached to an arm of said bell-crank and the other end attached to a fixed point within said casing, tension adjusting means for said spring engaging the other arm of said bell-crank, and an armature movable with said movable roller, whereby off-gauge variations in the material will correspondingly move said movable roller with respect to said fixed roller and thereby move said armature to plus or minus off-gauge indicating positions.

3. A gauge for measuring variable distances, comprising a housing, a hollow casing longitudinally slidable therein, a member flexibly mounted within said casing for movement in opposite directions longitudinally of said casing, a gauging roller mounted in fixed position on said housing, a second gauging roller carried by said yieldingly movable member and movable therewith, means for longitudinally setting said casing within said housing for a predetermined spacing of said rollers for the material being gauged, and a spring-tensioning device for said yieldingly movable member, said device including a bell-crank pivotally mounted on said movable member within said casing, a tension spring having one end attached to an arm of said bell-crank and the other end attached to a fixed point within said casing, tension adjusting means for said spring extending to the outside surface of said movable member and said adjusting means engaging the opposite arm of said bell-crank, and an armature movable with said movable roller, whereby off-gauge variations in the material will correspondingly move said movable roller with respect to said fixed roller and thereby move said armature to plus or minus off-gauge indicating positions.

DOROTHY B. LADRACH,
*Administratrix of Estate of Aaron G. Ladrach, Deceased.*

REFERENCES CITED

The following references are of record in the file of this patent:

UNITED STATES PATENTS

| Number | Name | Date |
|---|---|---|
| 1,409,907 | Abbott, Jr. | Mar. 21, 1922 |
| 2,177,399 | Allen | Oct. 24, 1933 |
| 2,184,035 | Buccicone | Dec. 19, 1939 |
| 2,207,237 | Bretholtz | July 9, 1940 |
| 2,299,997 | Ladrach | Oct. 27, 1942 |
| 2,331,779 | Hjampe et al. | Oct. 12, 1943 |
| 2,387,496 | Cornelius | Oct. 23, 1945 |
| 2,412,127 | Cooke | Dec. 3, 1946 |
| 2,437,639 | Floyd | Mar. 9, 1948 |

FOREIGN PATENTS

| Number | Country | Date |
|---|---|---|
| 216,444 | Switzerland | Dec. 1, 1941 |